United States Patent [19]

Hurdiel

[11] Patent Number: 5,017,330

[45] Date of Patent: May 21, 1991

[54] DEVICE FOR OPENING AND CLOSING A FILTER IN A NUCLEAR PLANT AND PROCESS FOR REPLACING THE FILTER PACKING

[75] Inventor: Alain Hurdiel, Eaubonne, France

[73] Assignee: Framatome, Courbevoie, France

[21] Appl. No.: 362,994

[22] Filed: Jun. 8, 1989

[30] Foreign Application Priority Data

Jun. 8, 1988 [FR] France ................. 88 07634

[51] Int. Cl.$^5$ ........................................... G21C 19/30
[52] U.S. Cl. ................... 376/260; 376/313; 210/237
[58] Field of Search ........... 376/260, 203, 204, 313, 376/460; 210/232, 237, 241, 251, 455, 473, 477, 479

[56] References Cited

U.S. PATENT DOCUMENTS

| | | | |
|---|---|---|---|
| 3,838,289 | 9/1974 | White | 376/260 |
| 3,890,233 | 6/1975 | Gischel | 210/237 |
| 4,124,446 | 11/1978 | de Francisco-Sainz | 376/313 |
| 4,577,112 | 3/1986 | Conche et al. | 250/506.1 |
| 4,769,133 | 9/1988 | Brookes et al. | 210/237 |

FOREIGN PATENT DOCUMENTS 2333329 6/1977 France.

OTHER PUBLICATIONS

Nuclear Engineering-vol. 26, No. 308, Jan. 1981, pp. 32–35.

*Primary Examiner*—Daniel D. Wasil
*Attorney, Agent, or Firm*—Pollock, Vande Sande & Priddy

[57] ABSTRACT

The device consists of a unit comprising a housing closure plug (13) extended by a cylindrical body (14), a maneuvering rod (20) mounted along the axis of an opening (18) passing axially through the plug (13) and the cylindrical body (14), a device (25, 26) for moving the maneuvering rod (20) axially, over a limited length, the head (30) for closing the filter (2) connected to one of the ends of the maneuvering rod (20) and a device for locking (38, 41) the head (30) onto the filter body (5). The device (12) makes it possible to carry out the replacement of the filter (2) packing without employing a handling module and special tooling for dismantling the filter head.

6 Claims, 8 Drawing Sheets

DEVICE FOR OPENING AND CLOSING A FILTER IN A NUCLEAR PLANT AND PROCESS FOR REPLACING THE FILTER PACKING

FIELD OF THE INVENTION

The invention relates to a device for opening and closing the head of a filter in a nuclear plant and a process for replacing the filter packing.

BACKGROUND OF THE INVENTION

In nuclear plants such as pressurized water nuclear reactors, filters are employed to retain the impurities carried by the fluids circulating in certain parts of the plant. These impurities may be radioactive, with the result that the filter packings retaining these impurities gradually become loaded with radioactive products.

In the case of some of these circuits, therefore, it becomes necessary to arrange each of the filters in a concrete housing ensuring biological protection of the region surrounding the filter.

For example, in the case of the circuit for chemical and volumetric monitoring of the reactor coolant water (CCV circuit), filters are arranged in some parts of the circuit to retain radioactive particles which may be carried by the reactor coolant water circulating in the primary circuit. The chemical and volumetric monitoring circuit is arranged as a bypass on the primary circuit and is situated for the most part inside the nuclear auxiliaries building adjacent to the reactor building. This circuit allows a proportion of the water in the primary circuit to be withdrawn in order to carry out the purification of this water and the adjustment of the concentrations of the chemical additives which are required in the primary fluid. The chemical and volumetric monitoring circuit consequently comprises a set of purification plants, means making it possible to perform additions of chemical products in a determined quantity, and heat exchangers allowing the water to be cooled or reheated after its withdrawal or before its return to the primary circuit.

Arranged upstream of some of the components of the volumetric and chemical monitoring circuit are filters intended to collect the radioactive impurities of a certain size which are carried by the primary fluid. These filters are arranged in concrete housings, inside the nuclear auxiliaries building.

To ensure the maintenance of these filters, it is necessary to replace the filter packing when the latter is blocked or excessively filled with radioactive products.

For this purpose, the filter body has an opening in its upper part which may be closed by means of a head and the housing comprises, in its upper part, an opening located vertically in line with the opening in the filter body and passing through the concrete wall of the housing. This opening in the housing is normally closed by a plug which ensures the continuity of the biological protection. The plug is removable and comprises means for attaching hooks enabling it to be lifted or replaced in the opening of the housing.

The replacement of the filter packing is a complex procedure involving many successive steps.

First of all, the plug closing the housing must be replaced with a handling module through which tools for unscrewing the head can be introduced into the housing. The handling module must comprise a porthole and means for illuminating the interior of the housing to enable the filter head to be seen while the tools are placed in position and the unscrewing takes place. The handling module is therefore a relatively complicated unit compared with a simple closure plug.

After unscrewing the head, the opening of this head is carried out, also by using a tool inserted into the housing through an opening in the handling module.

The handling module is then removed from the opening in the housing; a lead castle is placed above this opening, the packing is withdrawn from the filter body by using a handling and lifting means associated with the lead castle and this used packing is collected inside the lead castle. The lead castle is then removed and a new packing is installed in the filter body through the opening in the housing, using a handling and lifting tool. The handling module is then replaced on the opening of the housing and the closure and the screwing of the head is carried out using tools passing through the handling module.

The handling module is then dismounted and removed and is then replaced by the closure plug of the housing.

It appears, therefore, that the replacement of the filter packing requires a series of complex and relatively long operations and the use of tools and of specific means which must be specially designed.

SUMMARY OF THE INVENTION

The object of the invention is therefore a device for opening and closing a filter in a fluid circuit of a nuclear plant, arranged inside a biological protection housing having an opening for access to the filter in its upper part, capable of being closed by a plug equipped with lifting means, the filter comprising a body having, in its upper part an opening capable of being closed by a head and located vertically in line with the opening in the housing, this device making it possible to ensure the opening and the closing of the filter head and access to its packing, in a simple manner, without employing specific pieces of equipment such as a handling module.

To this end, the device according to the invention consists of a unit comprising:

the closure plug of the housing, which is extended by a cylindrical body in its axial direction and pierced by an opening passing through the plug and the cylindrical body along their axis and along their entire length, a maneuvering rod mounted along the axis of the opening passing through the plug and the cylindrical body, bearing on the plug, mounted so as to rotate around its axis in the opening of the plug and comprising a first end projecting relative to the plug forming a part for driving in rotation around its axis and a second, opposite end projecting relative to the cylindrical body, a device for moving the rod axially in either direction over a limited length, the closure head of the filter connected to the second end of the maneuvering rod, and a device for locking the head onto the body of the filter carried by the head and comprising a maneuvering device consisting of a nut engaged onto a threaded part of the second end of the maneuvering rod.

The invention also relates to a process for replacing the packing of a filter arranged in a biological protection housing, process is simpler and faster than the processes of the prior art, by virtue of the use of an opening and closing device according device to the invention.

BRIEF DESCRIPTION OF THE DRAWINGS

In order that the invention may be more clearly understood, a description will now be given, by way of example with reference to the attached drawings, of a number of embodiments of the invention and the use of this device during an operation for replacing the filter packing.

DESCRIPTION OF PREFERRED EMBODIMENTS

Figure 1:
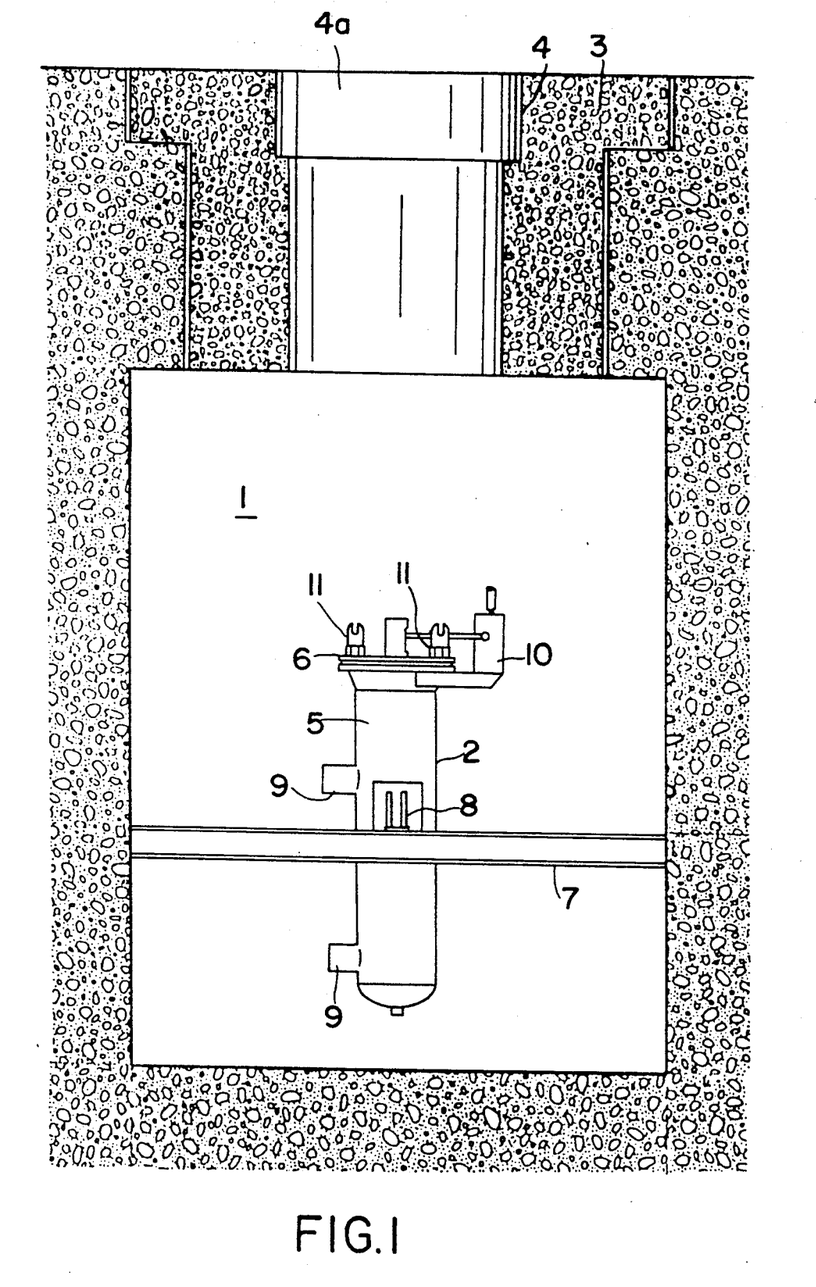
FIG. 1 is a view in section through a vertical plane of a biological protection housing containing a filter in the volumetric and chemical monitoring circuit of a pressurized water nuclear reactor, according to the prior art.

FIG. 1 shows the biological protection housing 1 of a filter 2 arranged in the volumetric and chemical monitoring circuit of a pressurized water nuclear reactor. The housing 1 comprises concrete side walls and bottom forming part of the nuclear auxiliaries building of the reactor, and an upper slab 3 of great thickness (of the order of a meter), having an opening 4 located vertically in line with the filter 2 and making it possible to gain access to the upper part of the filter.

While the filter is in operation, the opening 4 is closed by a device such as a plug 4a, making it possible to ensure the continuity of the biological protection of the housing.

The filter 2 comprises a body 5 closed in its lower part by a dished bottom and comprising an opening in its upper part which is closed by a head 6 when the filter is operating. Brackets 8 for supporting the filter are fastened to the middle part of the filter body 5 and rest on support beams 7 arranged transversely in the cavity of the housing 1 and secured in the walls of this housing. Pipes for the entry and exit of water 9 into the filter body 5 are connected to piping of the chemical and volumetric monitoring circuit, not shown.

According to a known arrangement, the head 6 comprises an opening and closing device 10 and locking screws 11.

The screw for controlling the opening and closing device 10 and the locking screws 11 are accessible from above the housing 1, by employing special tools and by installing a handling module in the opening 4.

The replacement of the filter 2 packing according to the prior art shown in FIG. 1 makes it necessary to perform successive operations which have been described above.

Figure 2:
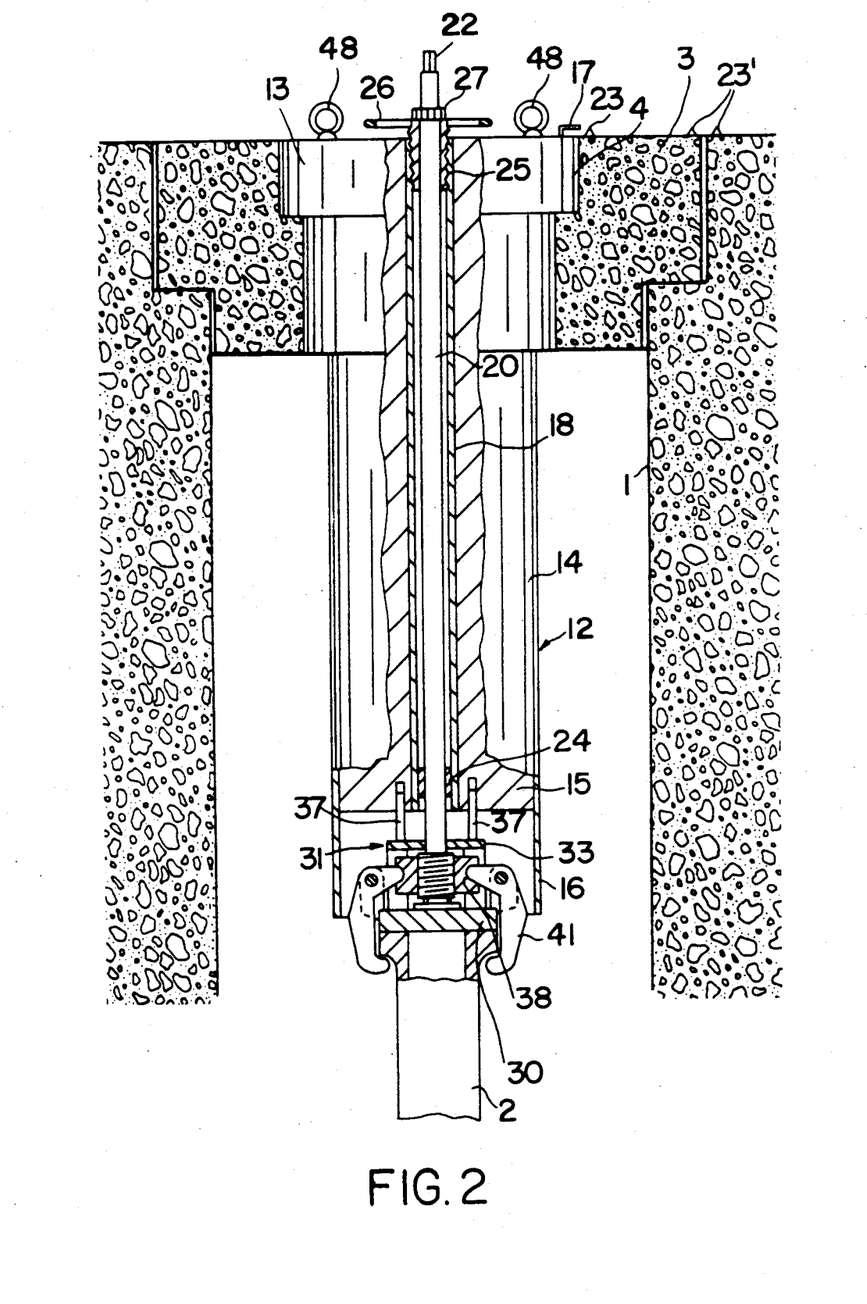
FIG. 2 is an elevation view with, partly in section, of a device for opening and closing the head of a filter, according to the invention.

FIG. 2 shows a device for opening and closing the head of a filter, according to the invention, which can be installed on the body 5 of a filter 2 such as shown in FIG. 1, the head 6 and its opening and closing device 10 having been eliminated.

The opening and closing device 12 according to the invention comprises a closure plug 13 whose shape and dimensions correspond to those of the opening 4 passing through the slab 3, extended in its axial direction by a cylindrical body 14 whose length corresponds substantially to the vertical distance separating the lower part of the slab 3 from the upper part of the body 5 of the filter 2 in position in the housing, as shown in FIG. 1.

The plug 13 and the cylindrical body 14 comprise a central block 15 of a heavy metal, e.g., steel, surrounded by a steel plate jacket 16.

The plug 13 has position indicators 17 ensuring its accurate positioning in orientation around the axis of the opening 4 in the slab 3. When the plug 13 is installed, the position indicators 17 are aligned with corresponding members 23 provided on the slab 3 and the upper part of the housing 1.

The massive central part of the plug 13 and of the body 14 is pierced throughout its length to form an opening 18 directed along the axis of the plug and of the cylindrical extension 14. The opening 18 may be bounded by an internal liner consisting of a steel tube.

A maneuvering rod 20 is arranged along the length of the opening 18 so as to have end parts projecting relative to this opening at both its ends. The end of the rod 20 projecting relative to the plug 13 has a part for driving in rotation 22, of square cross-section, onto which can be engaged a device for driving in rotation such as a key or a handle to cause the rod 20 to rotate around its axis.

The rod 20 is mounted for rotation around its axis inside the opening 18 by virtue of a smooth lower bearing 24 and of an upper sleeve 25 in whose internal bore the rod 20 is mounted with light friction. The sleeve 25 is threaded externally and is engaged in a corresponding tapped part of the opening 18, inside the plug 13.

In its upper part, the sleeve 25 is integrally attached to a handle 26 accessible from the upper surface of the plug 13 and permitting the sleeve 25 to be rotated around the axis of the opening 18 to ensure its screwing or its unscrewing in the threaded part of the opening 18. The rod 20 bears on the upper part of the sleeve 25 screwed into the plug 13, by means of an added ring 27.

The rod 20 is mounted so that it can both rotate and slide in the smooth bearing 24 and, at its lower end projecting relative to the cylindrical extension 14 of the plug 13, carries the head 30 of the filter 2.

Figure 3A:
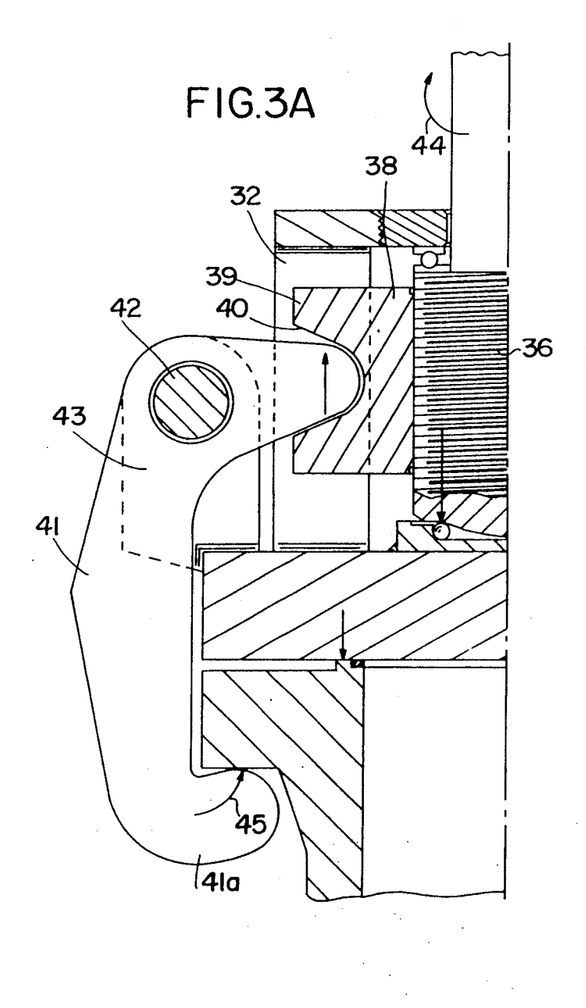
FIGS. 3A and 3B are sectional half-views on a larger scale of a part of the device for opening and closing, showing the device for locking the head in its locked position, and in its unlocked position respectively.
Figure 3B:
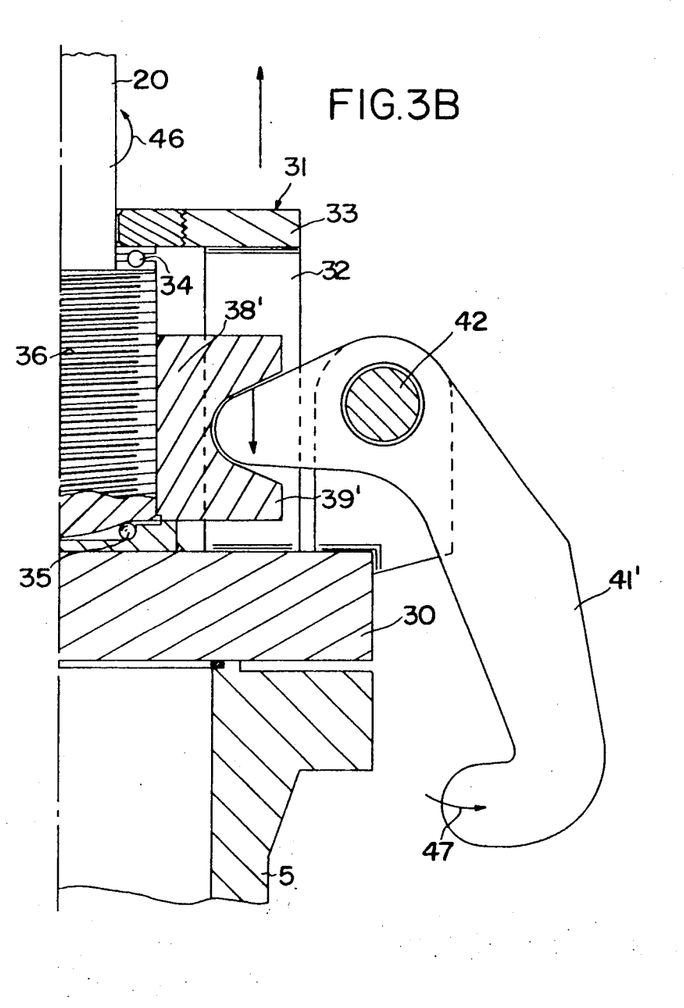

As can be seen in FIGS. 3A and 3B, the lower part of the rod 20 carries the head 30 by means of a suspension unit 31 integrally attached to the upper surface of the head 30. The unit 31 comprises a vertical structure 32, to the upper part of which is fastened a plate in two parts 33. The end of the rod 20 is mounted for rotation inside the suspension unit 31 by means of thrust ball bearings 34 and 35. The thrust ball bearing 35 is mounted on the upper face of the head 30 and the thrust bearing 34 on the lower face of the plate 33.

Between the thrust bearings 34 and 35, the end part of the rod 20, threaded on its outer surface, forms a maneuvering screw 36 which can be actuated by rotating the rod around its axis.

The screw 36 is in engagement with a nut 38 which comprises radial extensions 39 engaged in apertures in the vertical structure 32, in a vertical direction. The extensions 39 have rounded cavities 40, in each of which is engaged the end of a pawl 41 for locking the filter head 30. The locking pawls 41 are mounted so as to pivot by means of axles 42 on supports 43 integrally attached to the upper part of the head 30.

As can be seen in FIG. 2, the upper plate 33 of the suspension unit 31 carries two vertical studs 37 which are engaged so that they slide in two bores machined in the component 15. The studs 37 and the corresponding bores pointing in the axial direction of the plug and of the stem 20 produce a locking in rotation of the unit 31 and of the head 30 relative to the plug, when the rod 20 and the screw 36 are rotated inside the nut 38.

FIG. 3B shows locking pawl 41 in its unlocked position 41′ and FIG. 3A shows locking pawl 41′ in its locked position.

The pawls 41 can move from their position 41 for locking the head to their unlocking position 41′ on moving the nut and its radial extensions from their position 38, 39, to their position 38′, 39′ and vice versa. This movement of the nut 38 between its locking and unlocking positions can be obtained by rotating the screw 36, i.e., to say the rod 20, in either direction around its axis.

In one direction of rotation (arrow 44), the nut 38 moves upwards and drives pawl 41 in rotation in the direction of the arrow 45 by means of the cavity 40 of its extension 39. This rotation brings the lower hooked part 41a of the pawl into its hooking position under the flange of the upper part of the filter body 5.

Rotation of the maneuvering rod 20 and of the screw 36 in the other direction (arrow 46) results in the downward movement of the nut 38 and the pivoting of the pawls in the direction of the arrow 47.

The nut 38 is blocked in rotation inside the apertures in the structure 32 by means of its extensions 39. Moreover, the unit 31 is locked in rotation relative to the plug 13 by the studs 37.

In the device according to the invention the filter head 30, suspended at the end of the maneuvering rod 20 by means of the unit 31, is therefore an integral part of the device for opening and closing the filter, as is the plug 13. The device for locking the head is also suspended from the maneuvering rod 20, by means of the head 30.

It is quite obvious that any number of pawls 41 can be employed to ensure the locking of the head, these pawls being actuated simultaneously by a single nut 38. Depending on the design requirements of the device and the pressure prevailing inside the filter, two pawls placed at 180° around the head, three pawls arranged at 120° or four pawls arranged at 90° will preferably be employed.

The housing closure plug 13 comprises handling lugs 48 accessible from the upper part of the housing.

Figure 4A:
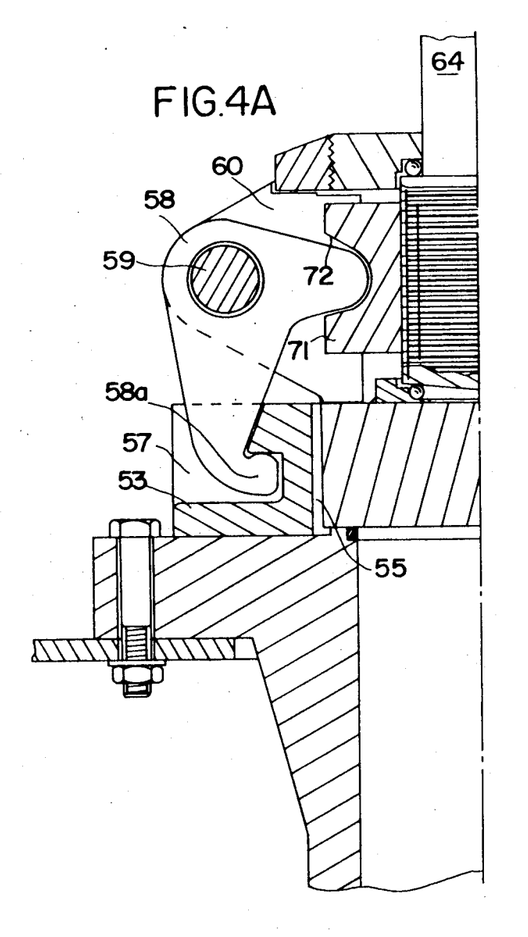
FIGS. 4A and 4B are half-views similar to the half-views 3A and 3B, showing an a second embodiment of the device for locking the head of a filter.
Figure 4B:
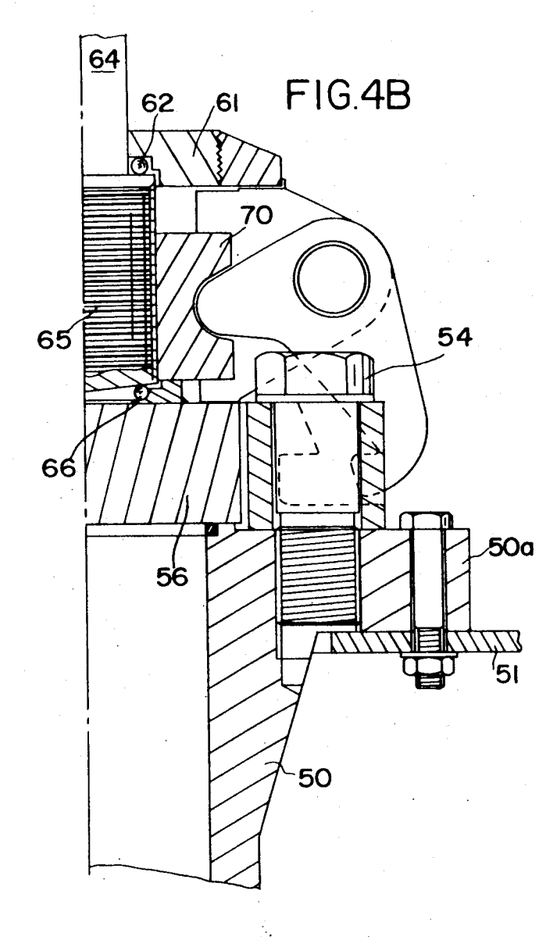

FIGS. 4A and 4B show an a second embodiment of the device for locking the head of a filter which can be employed in the case where the filter body 50 comprises an upper flange 50a fastened to a horizontal supporting plate 51 integrally attached to the housing structure. A mounting of this type is employed for certain filters in the chemical and volumetric monitoring circuit of pressurized water nuclear reactors which are operating at present.

In a filter of this type it is not possible to effect locking of the head by pressing the hooked ends of the pawls under the flange of the filter body.

The opening and closing device according to the invention can, however, easily be adapted to this filter structure by employing the embodiment shown in FIGS. 4A and 4B.

An anchor ring 53 is fastened by means of screws 54 to the upper flange 50a of the filter body 50. The anchor flange 53 comprises a central bore 55 inside which the filter head 56 is placed.

Moreover, the anchor ring is machined on its outer part to form hooking cavities 57.

The locking device comprises pawls 58 mounted so as to pivot around axles 59 on the pawl supports 60 fastened to the upper surface of the head 56. A suspension plate 61 is fastened to the upper part of the pawl supports 60 and on its lower surface comprises a thrust ball bearing 62 interacting with a widening of the maneuvering rod 64 at its lower end part forming a maneuvering screw 65. The end of the maneuvering screw 65 itself bears on a thrust ball bearing 66 integrally attached to the upper surface of the head 56. In this way, the end of the maneuvering rod 64 is responsible for the suspension of the head 56 while being mounted for rotation around its axis, relative to the head.

A nut 70 is engaged on the maneuvering screw 65 forming the lower part of the rod 64. This nut 70 has radial extensions 71 in which rounded cavities 72 are machined.

The cavities 72 interact with the end parts of the pivoting fingers 58 to ensure the pivoting movement of these fingers 58 between a locking position such as that shown in FIG. 4A and an unlocking position, shown in FIG. 4B.

This locking and this unlocking are obtained by a corresponding upward and downward movement of the nut 70, which is locked in rotation and guided in translation by the pivoting finger supports 60. These movements of the nut 70 in both directions are obtained by rotating the rod 64 in both directions. The locking in rotation of the suspension and locking unit and of the head relative to the plug is obtained by virtue of studs similar to the studs 37 (FIG. 2) fixed to the suspension plate 61.

In their locking position, the fingers 58 have their locking end 58a engaged in the cavities 57 machined on the outer part of the anchor ring 53 fastened to the upper flange 50a of the filter body 50.

Reference will now be made to FIGS. 5A to 5H, to describe the operation of an opening and closing device according to the invention and according to the embodiment shown in FIGS. 2 and 3.

Figure 5A:
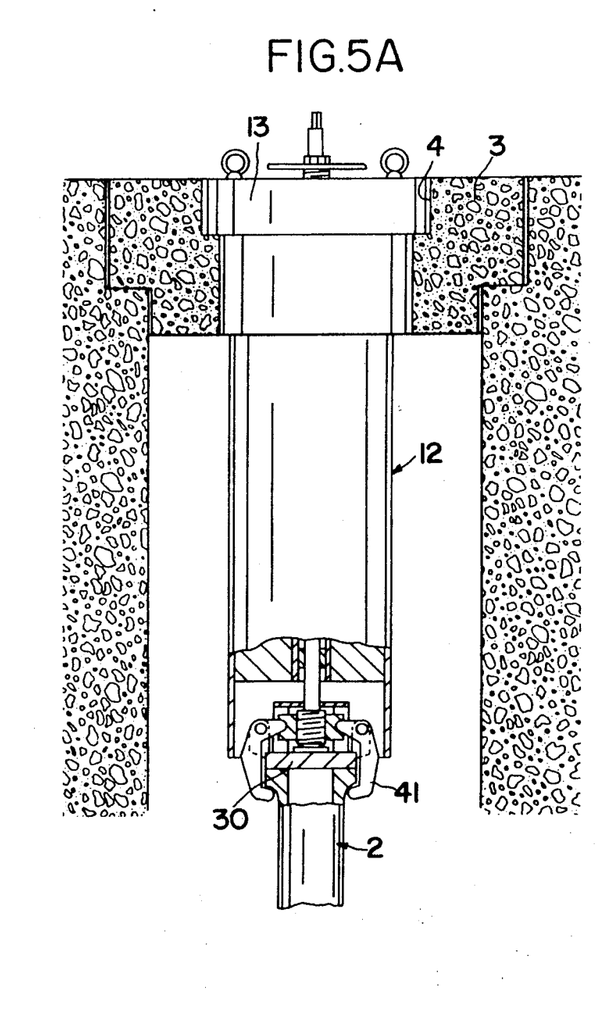
FIGS. 5A, 5B, 5C, 5D, 5E, 5F, 5G and 5H are elevation views of the closing device and of the upper part of the filter, during the various successive stages of a filter packing replacement operation.

FIG. 5A shows the upper part of the filter and the closing device in the position which they occupy when the filter is in operation.

The closing device 12 rests, by means of the plug 13, in the opening 4 in the slab 3, and the head 30 of the filter 2, fastened to the end of the unit 12, is in a leakproof closing position on the upper flange of the filter body 5. The pawls 41, in locking position, are responsible for holding the head in this leakproof closing position, whatever the pressure inside the filter body.

Figure 5B:
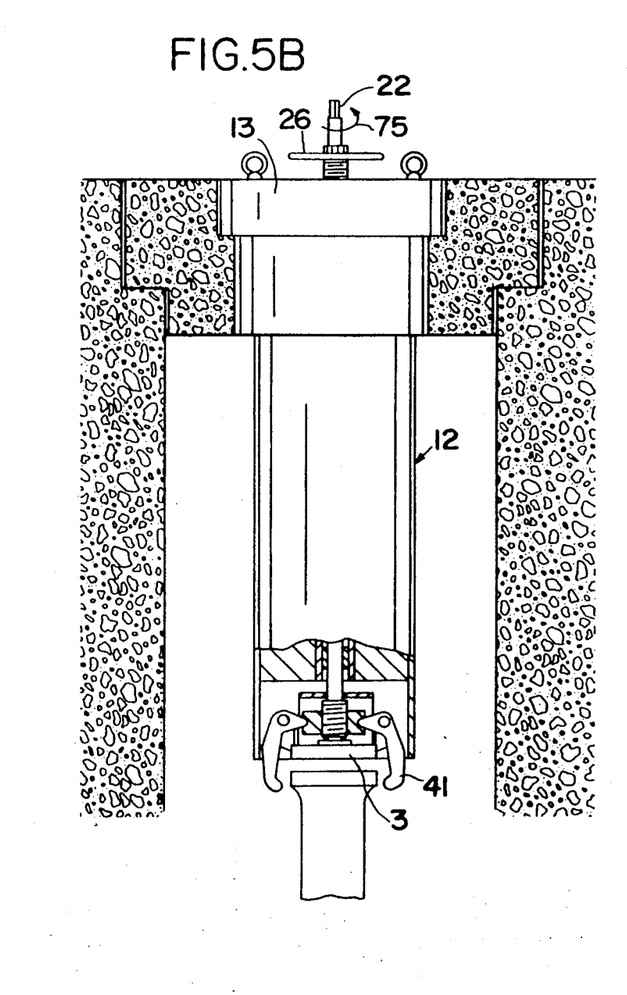

Thus, when the packing of the filter 2 is to be replaced, the unlocking is carried out and a limited lifting of the head 30 is performed, as shown in FIG. 5B, after the filter has been isolated from the (possibly pressurized) circuit in which it is inserted.

To carry out the unlocking of the head 30, the fingers 41 are made to pivot outwards by rotating the rod 20 around its axis, in the direction of the arrow 75. This rotation is obtained by using a key or a handle engaged on the square-sectioned part 22 of the rod 20 projecting above the plug 13.

When unlocking is completed, the nut 38 which can be seen in FIG. 3B has reached its position 38', where it is stopped by the thrust bearing 35

The threaded sleeve 25 is then caused to rotate in the unscrewing direction by using the handle 26. This lifts the maneuvering rod 20 bearing on the sleeve 25 by means of the ring 27. This movement of the rod 20 is accompanied by sliding of this rod inside the smooth bearing 24 and limited lifting of the head 30 above the end flange of the filter body 5. This lifting of the head 30 by a few millimeters allows the closing unit 12 to be completely separated from the filter body 5.

Figure 5C:
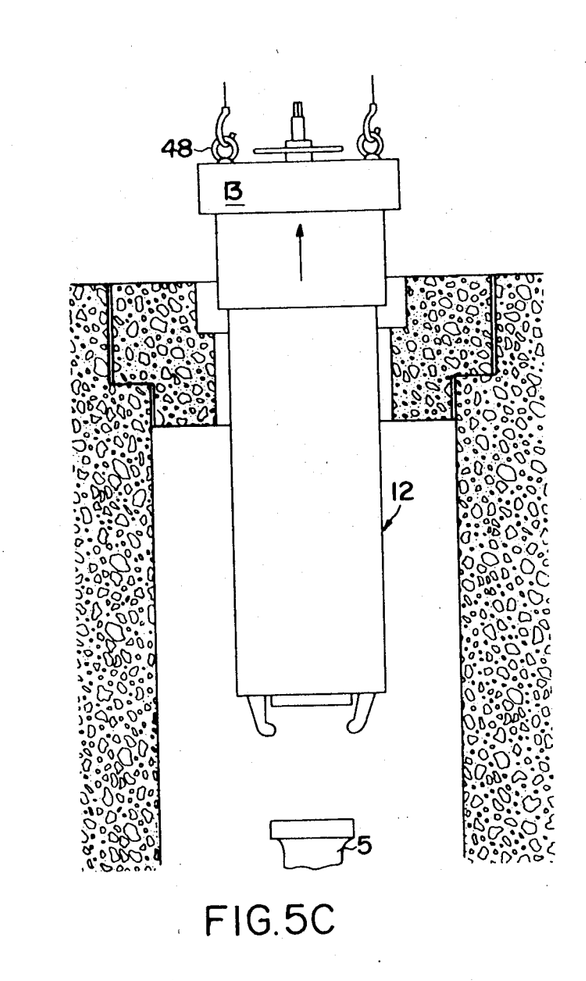

As can be seen in FIG. 5C, the closing unit 12 is then lifted and withdrawn from the housing 1 as a unit, using the lifting means comprising slings and hooks which are introduced into the lifting lugs 48 of the plug 13.

Figure 5D:
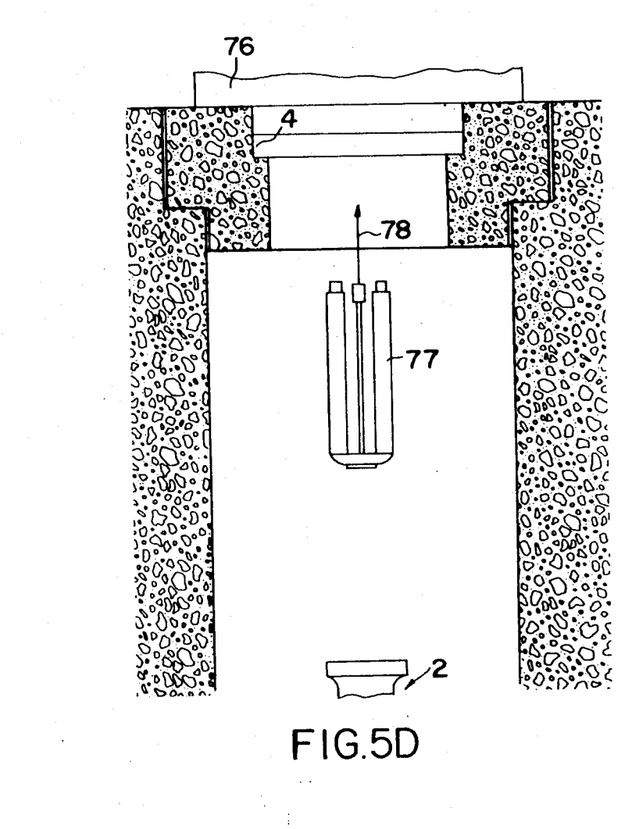

As can be seen in FIG. 5D, a lead castle 76 is then arranged above the opening 4 in the slab 3 located vertically in line with the upper opening of the filter body 5, which is then accessible.

The grasping means of a lifting machine associated with the lead castle 76 is caused to enter the upper part of the filter body to perform the grasping of the used packing 77 of the filter 2 and its insertion into the lead castle 76 by lifting in the vertical direction (arrow 78).

Figure 5E:
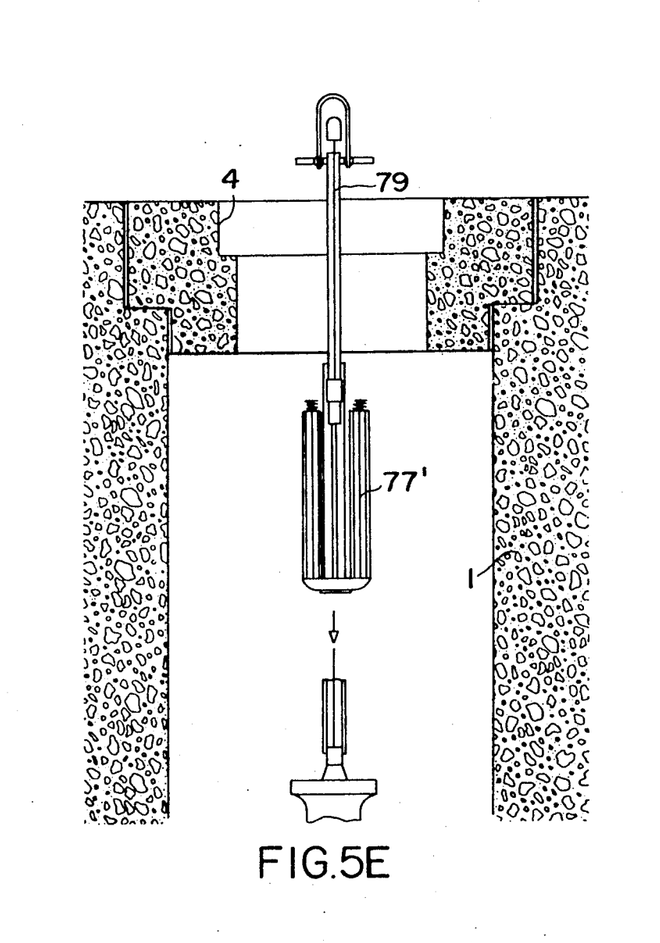

As can be seen in FIG. 5E, a new filter packing 77 is then inserted into the filter body 5 using a lifting and handling device 78, the opening 4 of the housing 1 being open to the ambient air, after removal of the lead castle 76 containing the used and radioactive packing 77.

It should be noted that the stages of the filter replacement process which are shown in FIGS. 5D and 5E and which correspond to the actual replacement of the packing are identical with the corresponding stages of the process according to the prior art.

Figure 5F:
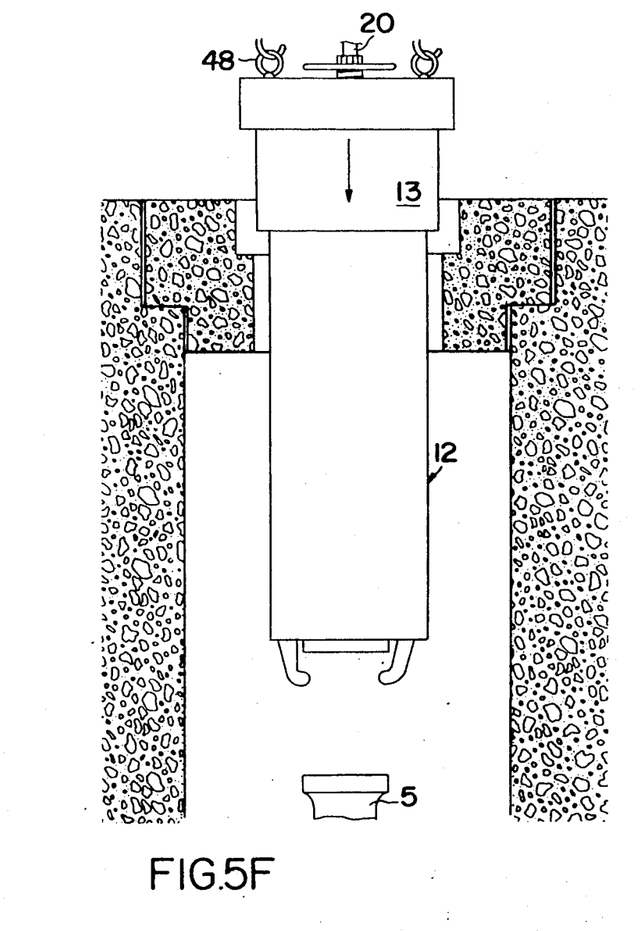

As can be seen in FIG. 5F, the replacement of the closing unit 12 is then carried out by a lifting device whose hooks are fastened to the handling lugs 48 of the plug 13.

The closing device 12 moves down vertically in the direction of the filter body 5, the plug 13 coming to rest on the corresponding shoulders of the opening 4 in the slab 3, at the end of the downward movement of the unit 12. The adjustment of orientation of the plug 13 inside the opening 4 is ensured by virtue of the position indicators 17 and 23. It should be noted that the head is held in its raised position relative to the cylindrical body 14 and to the plug 13, the threaded sleeve 25 being held in a high position and the maneuvering rod 20 from which the head 30 is suspended bearing by means of the ring 27 on the sleeve 25. The hooking fingers 41 are in an outspread, outward facing position.

Figure 5G:
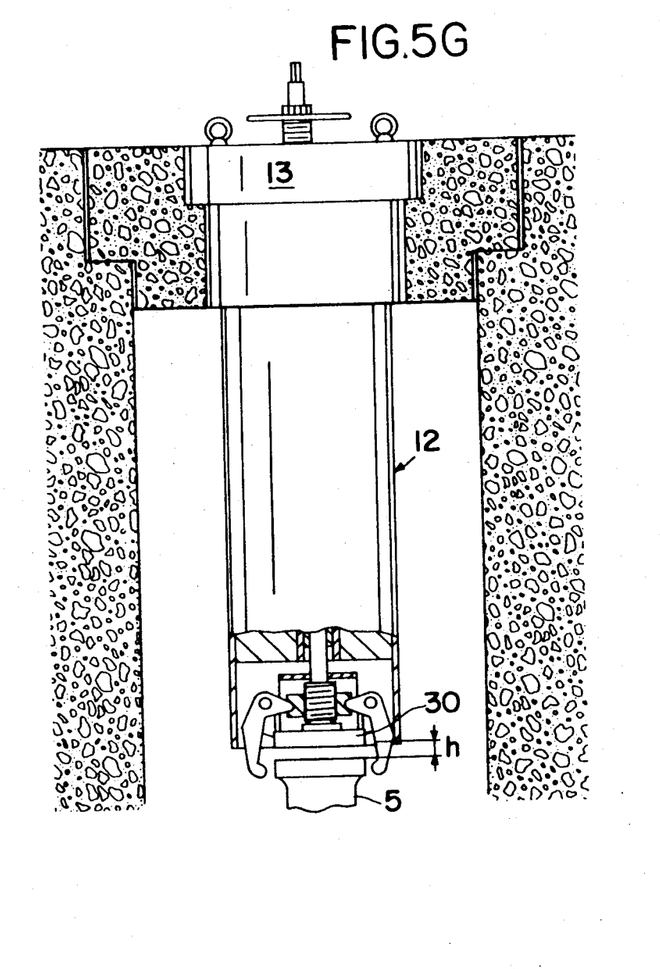

In this way, as can be seen in FIG. 5G, at the end of the downward movement of the unit 12, the head 30 is separated by a certain vertical distance h from the upper flange of the filter body 5. This distance of a few millimeters meters corresponds to the height of lifting of the head by rotation of the maneuvering rod 20, in the stage shown in FIG. 5B. The downward movement of the head until it contacts with the upper flange of the filter body 5 is then ensured by rotating the sleeve 25 in the screwing direction inside the plug 13, using the handle 26. The rod 20 and the head 30 accompany the sleeve 25 in its downward movement, until the head 30 comes to rest on the upper part of the body 5.

Figure 5H:
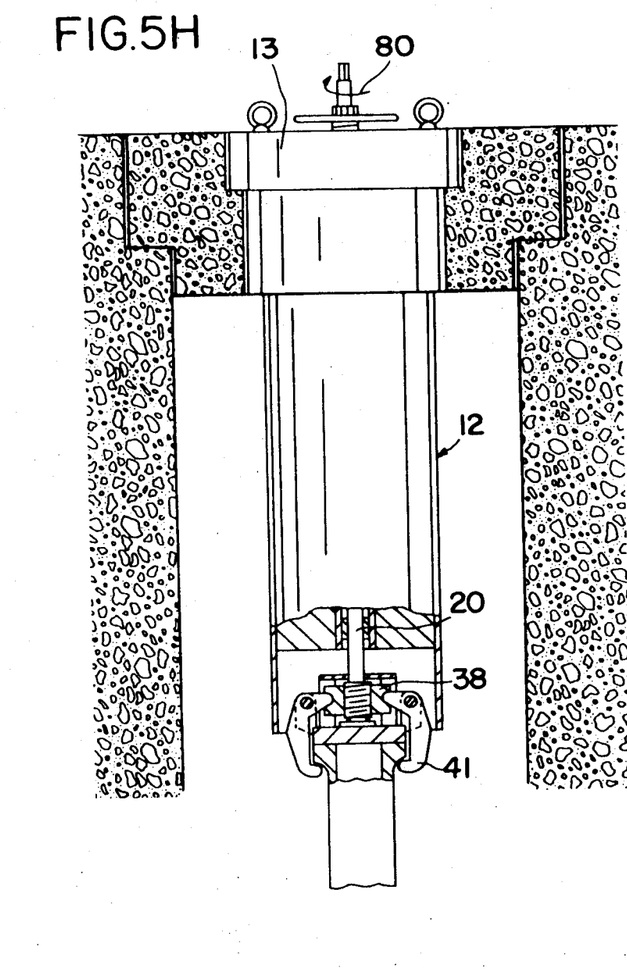

As can be seen in FIG. 5H, the screwing of the head 30 is then produced by rotating the rod 20 around its axis, in the direction of the arrow 80, which results in moving the nut 38 upwards and pivoting the locking fingers 41 inwards until they reach a locking position under the upper flange of the filter body 5, as shown on the left-hand side of FIG. 3.

The device has then returned to position shown in FIG. 5A, which corresponds to the operating position of the filter.

It is therefore quite obvious that the process for changing the filter packing which has just been described, employing the opening and closing device according to the invention, is much simpler and much faster than the device according to the prior art, which required the installation of a handling module, the use of specialized tools and the unscrewing and screwing of the head by remote control inside the housing, this operation requiring the inside of the housing to be seen and a presence of operators near the wells for access to the housing passing through the handling module, these operators being thus exposed to radioactive radiation.

Moreover, the opening and closing device according to the invention operates very safely and permits effective closing of the filter head whatever the pressure of the fluid inside the filter body.

The installation of the device according to the invention in the opening of the housing may be carried out with a conventional lifting means without the need for accurate monitoring of the installation and of the vertical movement of the device. In fact, the positioning of the filter head is carried out after the installation of the closing device according to the invention, the latter resting by means of the plug in the opening of the housing.

An opening and closing device comprising a plug and a cylindrical body may be produced in any manner, as a single unit or employing added and welded components.

The maneuvering rod may be mounted in any desired manner way inside the axial opening in the plug and in the cylindrical body and its bearing on the plug may be effected in any desired manner, by means of a mechanical or hydraulic lifting device with limited movement.

The device for locking the head may be of any type whatsoever, as long as this device can be controlled by the axial movement of a nut engaged on a threaded end of the maneuvering rod. The locking of the head may be effected on the filter body itself or on a component attached to this filter body.

The invention applies to any filter of a nuclear plant arranged inside a biological protection housing.

I claim:

1. Device for opening and closing a filter (2) in a fluid circuit of a nuclear plant, arranged inside a biological protection housing (1) having an upper part with an opening for access (4) to said filter (2), said opening being adapted to be closed by a closure plug (13) equipped with lifting means (48), said filter (2) comprising a body (5) having an upper part with an opening adapted to be closed by a closure head (30) and located in vertical alignment with said opening (4) in said housing (1), said device consisting of a unit comprising
   (a) said closure plug (13), extended by a cylindrical body (14) in its axial direction and pierced by an opening (18) passing through said closure plug (13) and said cylindrical body (14) along their common axis and along their entire length;
   (b) a maneuvering rod (20) mounted along the axis of said opening (18) passing through said closure plug (13) and said cylindrical body (14), bearing on said closure plug (13), mounted for rotation about its axis in said opening (18) and comprising a first end projecting relative to said closure plug (13) forming a part (22) for driving in rotation around its axis and a second, opposite end projecting relative to said cylindrical body (14);

(c) a device (25, 26) for moving said maneuvering rod (20) axially in either direction, over a limited length, consisting of a threaded sleeve (25) engaged in a tapped part of said opening (18) inside said closure plug (13) on which said maneuvering rod rests, by means of a ring (27) fastened to said first end of said maneuvering rod projecting relative to said closure plug (13), said threaded sleeve being equipped with means for manual actuation (26) for causing it to rotate in a screwing direction and in an unscrewing direction inside said closure plug (13);

(d) said closure head (30) of said filter, connected to said second end of said maneuvering rod (20); and (e) means for locking (36, 38, 41) said closure head (30) onto said body (5) of said filter (2) carried by said closure head (30) and comprising a maneuvering device consisting of a nut (38) engaged onto a threaded part (36) of said second end of said maneuvering rod (20).

2. Device according to claim 1, wherein said means for locking the closure head (30) comprises at least two pawls (41) mounted for pivoting movement about axles (42) on said closure head (30) and in engagement with said nut (38) engaged on said second end (36) of said maneuvering rod (20), so as to pivot when said nut (38) moves in the axial direction of said maneuvering rod (20), by rotation of said maneuvering rod (20) about its axis.

3. Device according to claim 2, wherein each of said pawls for locking said closure head (56) comprises a hooked part (58a) which, in a locking position of said pawl (58) is placed in a cavity (57) of an anchor ring (53) integrally attached to an upper part of said filter body (50), said closure head (56) in its closing position being placed at least partially inside an internal bore of said anchor ring (55).

4. Device according to claim 1, wherein said means for locking said closure head (30) comprises a support unit (31) integrally attached to an outer surface of said closure head (30) to which the second end (36) of said maneuvering rod (20) is connected by means of thrust ball bearings (34, 35), so as to ensure suspension of said closure head (30) from said maneuvering rod (20), said maneuvering rod (20) being mounted for rotation about its axis relative to said closure head, by means of said thrust ball bearings (34, 35).

5. Device according to claim 4, wherein said nut (38) is locked in rotation and guided in translation in the direction of said axis of said maneuvering rod (20) by said support unit (31).

6. Device according to claim 5, wherein said support unit (31) carries studs (37) parallel to said axis of said closure plug (13) and of said maneuvering rod (20), and said cylindrical body (14) of said closure plug (13) comprises bores in which said studs (37) are slidingly engaged to produce locking in rotation of said support unit (31).

* * * * *